(12) United States Patent
Brooks et al.

(10) Patent No.: US 10,244,383 B2
(45) Date of Patent: *Mar. 26, 2019

(54) SYSTEM AND PROCESS FOR HAVING WIRELESS SERVICE VALUE INCLUDED IN A SIM CARD

(71) Applicant: TracFone Wireless, Inc., Miami, FL (US)

(72) Inventors: David Brooks, Miami, FL (US); Sergio Rivera, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/874,410

(22) Filed: Jan. 18, 2018

(65) Prior Publication Data
US 2018/0160295 A1 Jun. 7, 2018

Related U.S. Application Data

(63) Continuation of application No. 15/089,919, filed on Apr. 4, 2016, now Pat. No. 9,883,374.

(60) Provisional application No. 62/150,614, filed on Apr. 21, 2015.

(51) Int. Cl.
*H04B 1/38* (2015.01)
*H04W 8/18* (2009.01)
*H04W 12/08* (2009.01)
*H04W 8/26* (2009.01)

(52) U.S. Cl.
CPC ........... *H04W 8/183* (2013.01); *H04W 12/08* (2013.01); *H04W 8/265* (2013.01)

(58) Field of Classification Search
CPC ...... H04W 8/183; H04W 12/08; H04W 8/265
USPC ............ 455/558, 419, 41.2, 406, 411, 550.1, 455/414.2
See application file for complete search history.

(56) References Cited

U.S. PATENT DOCUMENTS

| | | | |
|---|---|---|---|
| 8,107,953 B2 | 1/2012 | Zimmerman et al. |
| 8,538,394 B2 | 9/2013 | Zimmerman et al. |
| 8,805,323 B2 | 8/2014 | Ramprasad et al. |
| 8,811,983 B2 | 8/2014 | Zimmerman et al. |
| 8,818,331 B2 | 8/2014 | Mohammed et al. |
| 9,154,952 B2 | 10/2015 | Dennis et al. |
| 9,226,151 B2 | 12/2015 | Mohammed |
| 9,456,348 B2 | 9/2016 | Dennis et al. |
| 9,603,005 B2 | 3/2017 | Kim |

(Continued)

*Primary Examiner* — Marceau Milord
(74) *Attorney, Agent, or Firm* — BakerHostetler

(57) ABSTRACT

A method and system a system for activating a wireless service includes a subscriber identity module (SIM) card having a first surface, the SIM card including a subscriber identity module (SIM), and an activation code stored with the SIM card. The activation code is linked to the SIM. A wireless device configured to receive the SIM, where the SIM is configured to be utilized in the wireless device, the wireless device including: a memory that stores an operating system of the wireless device and a wireless service activation application, a processor that processes a function of the wireless device, a display that displays information to a user, the wireless service activation application is configured to capture the activation code that authorizes the wireless device on a wireless network and authorizes a predetermined amount of wireless service for the wireless device associated with said SIM.

20 Claims, 5 Drawing Sheets

(56) References Cited

U.S. PATENT DOCUMENTS

| | | | |
|---|---|---|---|
| 9,877,191 B2* | 1/2018 | Martinez | H04W 8/18 |
| 9,883,374 B2* | 1/2018 | Brooks | H04W 12/08 |
| 2007/0078723 A1 | 4/2007 | Downes et al. | |
| 2007/0208632 A1 | 9/2007 | Downes et al. | |
| 2008/0251587 A1* | 10/2008 | Martinent | G06K 19/07739 |
| | | | 235/492 |
| 2009/0247077 A1* | 10/2009 | Sklovsky | G06F 9/445 |
| | | | 455/41.1 |
| 2012/0191612 A1 | 7/2012 | Spodak et al. | |
| 2013/0116010 A1* | 5/2013 | Lepp | G06K 19/072 |
| | | | 455/558 |
| 2013/0200999 A1 | 8/2013 | Spodak et al. | |
| 2013/0304642 A1* | 11/2013 | Campos | G06Q 20/36 |
| | | | 705/41 |
| 2014/0228039 A1 | 8/2014 | Zhao et al. | |
| 2015/0181411 A1 | 6/2015 | Kim | |
| 2015/0189496 A1* | 7/2015 | Park | H04W 8/183 |
| | | | 455/418 |
| 2016/0021537 A1* | 1/2016 | Dennis | H04L 63/0853 |
| | | | 726/4 |
| 2016/0352922 A1* | 12/2016 | Patel | H04M 15/705 |

\* cited by examiner

SYSTEM AND PROCESS FOR HAVING WIRELESS SERVICE VALUE INCLUDED IN A SIM CARD

CROSS REFERENCE TO PRIOR APPLICATIONS

This application is a continuation of the U.S. patent application Ser. No. 15/089,919, filed Apr. 4, 2016, now U.S. Pat. No. 9,883,374 issued Jan. 30, 2018. This application further claims the benefit from U.S. Provisional Application No. 62/150,614 filed on Apr. 21, 2015. Both applications are hereby incorporated by reference for all purposes as if fully set forth herein.

BACKGROUND OF THE DISCLOSURE

1. Field of the Disclosure

The disclosure relates to a system for activating wireless services on wireless devices. More particularly, the disclosure relates to a SIM (subscriber identity module or subscriber identification module) card having built in wireless service value, a wireless service code and/or a wireless activation code.

2. Related Art

A large number of cellular wireless service plans exist for customers desiring wireless cellular services such as data, talk, and text messaging. Customers generally have the option of entering into a post-paid service, e.g., contract for a period of time, or a pre-paid, contract-free service. A Mobile Virtual Network Operator (MVNO) is a mobile operator that typically does not own its own frequency spectrum or have its own wireless network infrastructure. MVNOs negotiate and enter into business agreements with third party wireless carriers to purchase the right to use their networks for wireless services including volume of data and number of minutes/text messages used.

MVNOs often implement activation cards, also known as airtime cards, for the sale and activation and/or addition of a wireless service, e.g. talk airtime, data, or text messaging. Activation cards generally include a unique code that may include a scratch off cover obscuring the unique code consisting of a long series of letters and numbers. Codes are correlated to a wireless service and are stored in a MVNO's database prior to distributing the activation card to a respective point-of-sale and reaching the customer. Once a card is sold to a user, the user must manually scratch off the covering of the code and manually enter the code into the phone or in a computer linked to the MVNO's database to activate the wireless service.

In order to increase the customer base, MVNOs may provide a SIM card to be activated using an airtime card that is bundled with the SIM card. However, often times, the customer will discard the SIM card and simply use the airtime card to add more time to an existing SIM card. Additionally, a SIM card to be activated using an airtime card that is bundled with the SIM card may require the user to execute multiple steps to authorize wireless service which may be confusing or deter the user from adopting a wireless plan. Accordingly, there is a need for new and improved devices, processes, and systems that can be implemented for the activation of a wireless service.

SUMMARY OF THE DISCLOSURE

The foregoing needs are met, to a great extent, by the disclosure, providing a system and associated methods for activating services and subscriptions on wireless devices and/or systems implementing a SIM card having wireless service by.

According to aspects of the disclosure, a system for activating a wireless service includes a subscriber identity module (SIM) card having a first surface, the SIM card including a subscriber identity module (SIM), and an activation code stored with the SIM card, the activation code is linked to said SIM, a wireless device configured to receive the SIM, where the SIM is configured to be utilized in the wireless device, the wireless device including: a memory that stores an operating system of the wireless device and a wireless service activation application, a processor that processes a function of the wireless device, a display that displays information to a user, where the display includes a touch screen, and the processor implements the wireless service activation application, the wireless service activation application is configured to capture the activation code that authorizes the wireless device on a wireless network and authorizes a predetermined amount of wireless service for the wireless device associated with said SIM.

According to some additional aspects, a device for activating a wireless service includes a subscriber identity module (SIM) card having a first surface, the SIM card including a subscriber identity module (SIM), and an activation code stored with the SIM card, the activation code is linked to said SIM, where the SIM is configured to be utilized in a wireless device configured to receive the SIM, the wireless device including a memory that stores an operating system of the wireless device and a wireless service activation application, a processor that processes a function of the wireless device, a display that displays information to a user, where the display includes a touch screen, and the processor implements the wireless service activation application, the wireless service activation application is configured to capture the activation code that authorizes the wireless device on a wireless network and authorizes a predetermined amount of wireless service for the wireless device associated with said SIM.

According to some additional aspects, a process for authorizing wireless service includes providing a generally rectangular flat form factor card having a first surface and opposing second surface, providing at least one removable subscriber identity module (SIM) arranged in the generally rectangular flat form factor card defined by the first surface, where the at least one removable subscriber identity module (SIM) is releasably attached to the first surface of the generally rectangular flat form factor card by respective breaking tabs, and providing an activation code stored at least in one of the following: the removable subscriber identity module (SIM) and the generally rectangular flat form factor card, where the activation code is configured to authorize wireless service associated with the at least one removable subscriber identity module (SIM) when provided to a system associated with a wireless service provider, and provisioning the wireless service to a wireless device from a wireless network when the wireless device operates in conjunction with the at least one removable subscriber identity module (SIM) and the activation code is provided to the system associated with the wireless network.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will also form the subject matter of the claims appended hereto.

In this respect, before explaining at least one aspects of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which.

DETAILED DESCRIPTION

In this specification and claims it is to be understood that reference to a "wireless device" is intended to encompass any compatible computing device that can connect to a wireless communication network, such as mobile phones, personal computers, PDAs, tablet computers, gaming systems, MP3 players, mobile equipment, mobile stations, cellular phones, smartphones, handsets, (e.g., Apple iPhone, Google Android, Microsoft Windows or Blackberry based devices, other types of PDAs or smartphones), wireless dongles, or other mobile computing devices and the like. The term "wireless device" may be interchangeably used and referred to herein as "wireless handset," "handset," "mobile device," "device," "mobile phones," "mobile equipment," "mobile station," "user equipment," "cellular phone," "smartphones," or "phone."

A "point-of-sale" as used herein can refer to a location where one or more wireless devices and/or services can be sold and/or activated which may or may not require sales personnel. A point-of-sale can include, for example, a vending machine, an automated kiosk, a retailer store, a kiosk in a mall, a gas station, a convenient store, a web site, and such.

Wireless devices may connect to a "wireless network" or "network" and are intended to encompass any type of wireless network to obtain or provide mobile phone services through the use of a wireless device, such as the Global System for Mobile Communication (GSM) network, Code-Division Multiple Access (CDMA) network, Long-Term Evolution (LTE) network, 5G (fifth generation) network, and/or a communication channel as defined herein, that may utilize the teachings of the present application to sell, activate, monitor, redeem, and/or track, the activation of one or more wireless services.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not for other aspects.

Figure 1:
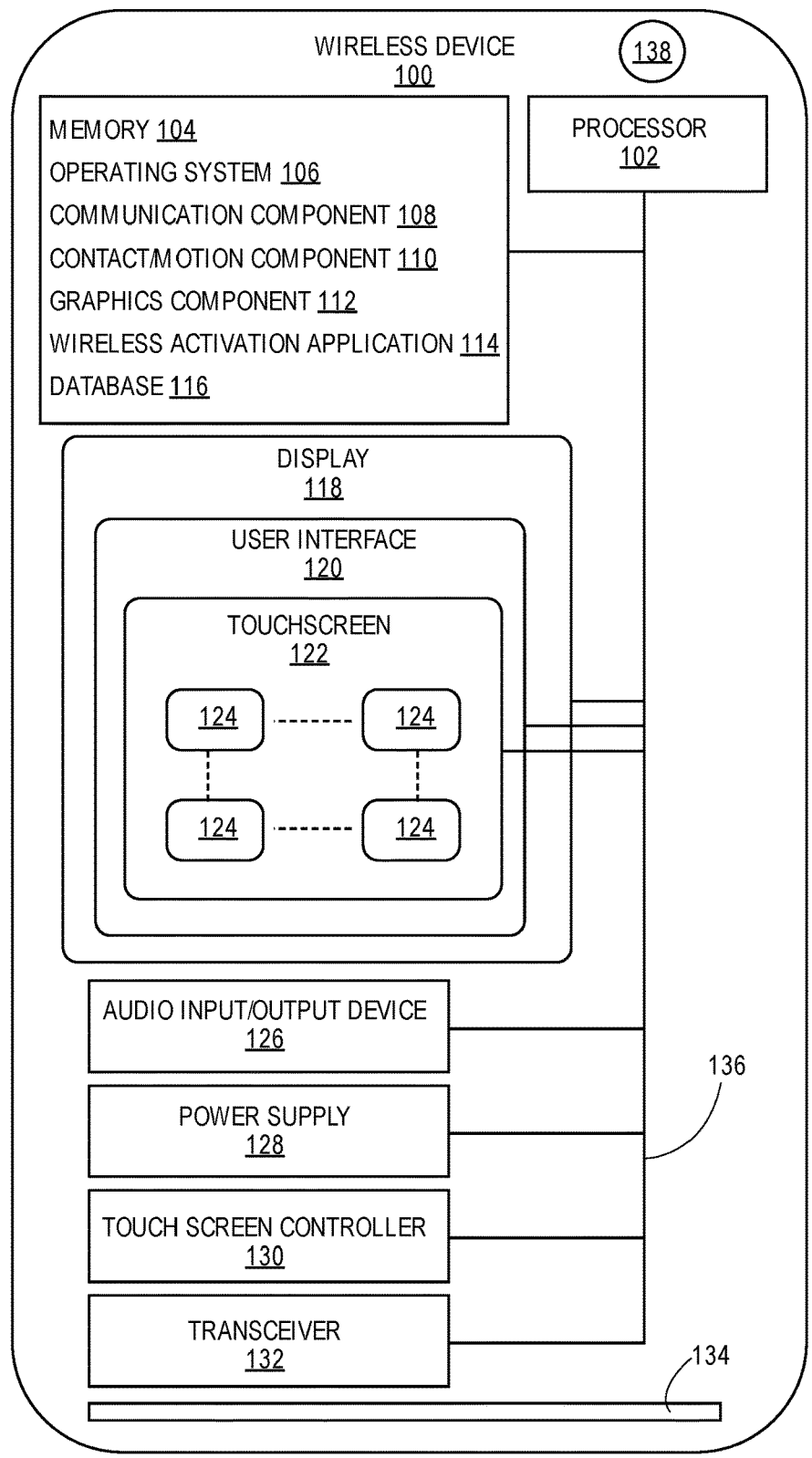
FIG. 1 illustrates a block diagram of exemplary components of a wireless device in accordance with aspects of the disclosure.

Referring now to FIG. 1, a block diagram with exemplary components of a wireless device 100 in accordance with aspects of the disclosure is shown. In particular, the exemplary components which include a near field communication interface 134, e.g., reader or scanner, which may be used in conjunction with one or more near field communication tag(s) (shown in FIG. 3B) during the distribution, verification, and/or sale/purchase, of a wireless service. Other uses of the near field communication interface 134 for the activation of a wireless service can include, but are not limited to, a change of phone settings, an activation message (e.g. text message) to be created and sent and ultimately received back, starting of an application (e.g. payment application), and the like.

In addition, the wireless device 100 can include a power supply 128 in the form of a battery and a camera 138 that is multifunctional. The camera may be used to capture images such as of a person or place, biometric readings such as a fingerprint or a retina, letter, symbols, and numbers (optical character reading), image of a bar code such as QR code, and the like. The camera 138 may be on the front, back, sides and the like of the wireless device 100.

The near field communication interface 134 and the camera 138 can be in communication with a processor 102, memory 104, and a user interface 120. The processor 102 may be a central processing unit configured to execute instructions such as instructions related to software programs. Any processor such as a FPGA, an ASIC, a microprocessor, a controller, and the like can be used for the wireless device 100 as understood to those of ordinary skill in the art. The display 118 may be a liquid crystal display (LCD), LED (light emitting diodes), OLED, and the like. Preferably the LCD includes a backlight to illuminate the various color liquid crystals to provide a more colorful display. The user interface 120 may be any type of physical input as readily employed in the field. For example, the user interface 120 may have physical buttons having alphanumeric labels thereon that can be used to enter a sequence of numbers, letters, symbols, or a combination thereof. Alternatively, the user interface 120 may be implemented on a touchscreen 122, a motion sensor (not shown), and the like.

The memory 104 of the wireless device 100 may further include an operating system 106 (Windows, Apple IOS, Google Droid, etc.), a communication component 108, a contact/motion component 110, a graphics component 112, a wireless service activation application 114, a database 116, and the like. The operating system 106 together with the various components provides software functionality for each of the components of the wireless device 100. The memory 104 may include a high-speed, random-access memory. Also, the memory 104 may be a non-volatile memory, such as magnetic fixed disk storage, SIM, UICC, cloud-based memory, flash memory or the like. These various components may be connected through various communication lines including a data bus 136.

The wireless device 100 can include an audio input/output device 126. The audio input/output device 126 may include speakers, speaker outputs, and the like, providing sound output; and may include microphones, microphone inputs, and the like, for receiving sound inputs. In an exemplary aspect, the audio input/output device 126 may include an analog to digital converter and a digital to audio converter for audio input and output functions, respectively.

In another aspect, the wireless device 100 may include a transceiver 132 that provides radio and signal processing as needed to access a wireless network for services. The processor 102 may be configured to process call functions, data transfer, and the like and provide an array of services, based on those functions, to the user.

In an exemplary aspect, the touchscreen 122 of the disclosure may be implemented in the display 118 (entire or a portion thereof) or separate from the display, and may detect a presence and location of a touch of finger or hand of a user within the display area. The touchscreen 122 may also sense other passive objects, such as a stylus and/or, in some aspects, for example, the touchscreen 122 may serve as the near field communication interface 134 when the near field communication tag(s) include a conductive component. The touchscreen 122 may be controlled by a touchscreen controller 130.

In one operation, the display 118 may show various objects 124 associated with applications for execution by the processor 102. For example, a user may touch the display 118, particularly the touchscreen 122, to interact with the objects 124. That is, touching an object 124 may execute an application stored in the memory 104 by the processor 102 and associated with the object 124. Additionally or alternatively, touching an object 124 may open a menu of options to be selected by the user. The display 118 may include one or a plurality of objects 124 for the user to interact with. Moreover, the display 118 may include a plurality of screens and show one or more screens at a time. The user may interact with the display 118 to move a screen into view on the display 118. Various objects 124 may be located in each of the screens.

The touchscreen 122 may be implemented as a resistive touchscreen, a surface acoustic wave touch screen, a capacitive touchscreen, self-capacitance sensors, infrared sensors, dispersive signal technology, acoustic pulse recognition, or the like. As previously mentioned, the touchscreen 122 can function as the near field communication interface 134 when conductive near field communication tags are implemented according to aspects of the present disclosure.

The display 118 is generally configured to display a graphical user interface (GUI) 120 that provides an easy to use visual interface between a user of the wireless device 100 and the operating system 106 or application(s) running on the wireless device 100. Generally, the GUI presents programs, files and operational options with graphical images. During operation, the user may select and activate various graphical images displayed on the display 118 in order to initiate functions and tasks associated therewith.

In another aspect of the disclosure, the memory 104 of a wireless device 100 can include the database 116 for storing user information and activation codes (valid and not used, currently used, previously used) or information. The user information may include full name, address, email address, contact number, credit card information, and the like. In one aspect, the database 116 may include security questions. In another aspect, the database 116 may include user specified preferences.

In yet another aspect of the application, the memory 104 of a wireless device 100 can include a wireless service activation application 114. The application 114 may be preinstalled or downloaded from an application store (Android Store, Blackberry Store, Windows Store or Apple iTunes and the like). In another aspect, the application 114 can be installed in a memory a SIM 301, 351 of a SIM card 300, 350 (FIGS. 3A and 3B) and is installed manually or automatically when the SIM 301, 351 of the SIM card 300, 350 is inserted into the wireless device 100. Upon installation, the air time activation code can also be retrieved as it can be embedded or stored in the memory of the SIM 301, 351 of the SIM card 300, 350 along with the application 114. The wireless service activation application 114 may be configured to control use of the wireless device 100 based on interaction with a wireless provider backend system 422 (shown in FIG. 4) and/or one or more near field communication tag(s) (shown in FIG. 3B) and/or an activation code, such as a bar code or an alpha numeric code, for the activation of a wireless service. The wireless service activation application 114 may utilize an internal accounting module to establish an account with a representation of prepaid funds or available credit for wireless services. In some aspects, the internal accounting module of the wireless service activation application 114 may also be used to store and/or transmit a plurality of charge rates as well as a billing/payment algorithm. The internal accounting module can classify each wireless service (data, voice, SMS) into one of a plurality of billing categories; receive data correlated to the near field communication tag(s) identifier or activation code (entered or captured by the camera, for example), select a charge rate corresponding to that billing category; calculate an appropriate charge for the data usage, voice usage, and SMS usage in real time by using the selected charge rate; and apply this appropriate charge to the account. For example, upon the retrieval and/or verification of a unique identifier of a near field communication tag by the near field communication interface 134 or an activation code captured by the camera 138, entered via the user interface 120, or automatically retrieved from the SIM 301, 351 of the SIM card 300, 350, the one or more steps may automatically take place to apply an appropriate charge or credit to the account.

In some aspects, once the internal accounting module determines that the amount of wireless service (data, voice, SMS) used has depleted the account to zero or a predetermined amount, the processor 102 may interact with the internal accounting module and/or the wireless provider backend system 422 to limit, prevent, alert the user, and/or control further use of the wireless device 100 as further described herein. The controlled use can include suspending voice calls, allowing limited voice calls, allowing all voice calls, suspending text messages, allowing limited text messages, allowing all text messages, suspending wireless data service, limiting wireless data service, throttling wireless data service, and allowing all wireless data service. In this aspect, the wireless service activation application 114 may also include a module for one or more system provider host processors, which store wireless device identification information; store operating codes needed for wireless device activation; and store operating codes needed for setting prepaid funds or available credit amounts in wireless device accounts whereby, upon receipt of wireless device identification information from a near field communication tag or an activation code, the host processor may be capable of ascertaining the operating codes needed to activate that particular wireless device or needed to set its account amount.

The internal accounting module may also be implemented partially in the wireless device 100 and in a wireless network as disclosed in U.S. Pat. No. 8,805,323, entitled Hybrid network based metering server and tracking client for wireless services, issued Aug. 12, 2014, and incorporated herein by reference in its entirety. Moreover, the internal accounting module may be located entirely in the wireless network and provide functionality consistent as noted above.

Figure 2:
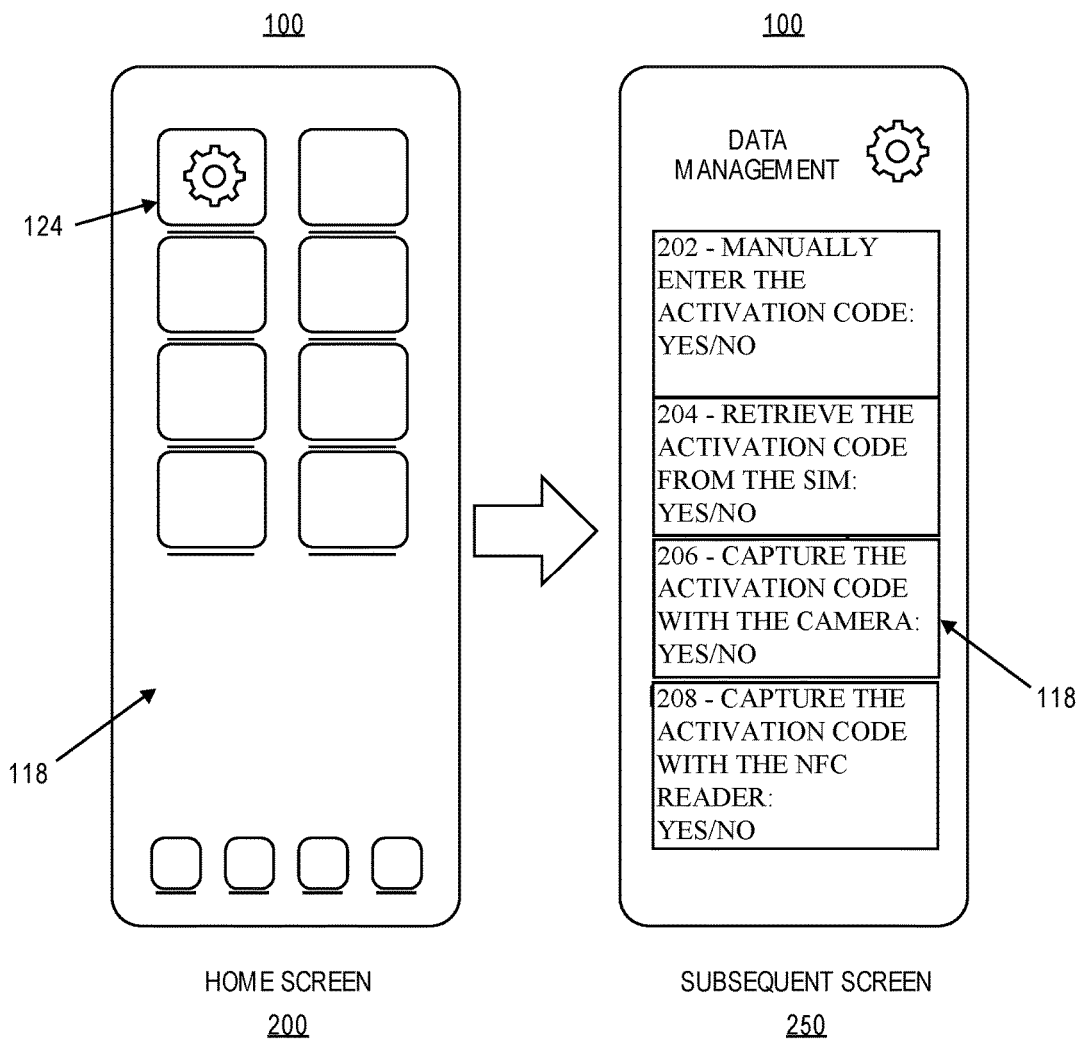
FIG. 2A illustrates an exemplary wireless device with a display of a home screen on a graphical user interface and FIG. 2B illustrates a subsequent screen showing a wireless service activation application on a graphical user interface, both of which may be used for the selection and control of the activation of a wireless service in accordance with an aspect of the disclosure.

FIG. 2A illustrates an exemplary wireless device 100 with a display of a home screen 200 and FIG. 2B a subsequent screen 250 of a wireless service activation application 114 with a graphical user interface on a display 118, both which may be used for the selection and control of the activation of a wireless service in accordance with an aspect of the disclosure. The home screen 200 may include a plurality of objects 124 in the form of icons, and is not limited to a calling icon, texting icon, internet icon, and the like, allowing a user to perform one or more functions on the wireless device 100. For example, the home screen 200 may also display the icons 124 for one or more applications that have been downloaded from the Internet or pre-installed, and unlocked/retrieved using one or more near field communication tag(s) or an activation code. In some aspects, an application such as Google Wallet™, Google Play™, Android Market™, Apple Store™, or the like, may also function with the one or more near field communication tag(s) or activation code to process or credit a payment or redeem a credit (contest give away), add or redeem gift card value, add or redeem coupons or other data during the activation of one or more selected wireless service.

As shown in FIG. 2B, the wireless service activation application 114 may provide numerous ways in which to receive an activation code. At input 202, a user may indicate that they want to manually enter the activation code. At input 204, a user may indicate that they want to retrieve the activation code from the SIM. At input 206, a user may indicate that they want to capture the activation code with the camera. At input 208, a user may indicate that they want to capture the activation code with the near field communication interface 134.

Some of the payment and/or authentication applications may be stored in a robust manner that prevents a user from deleting, modifying, tampering, and the like, with the application's functionality. In this regard, the wireless service activation application 114, for example, can provide data management information, as depicted in subsequent screen 250, but may not allow or limit user's input for the activation and/or control of the wireless services. Further, in some aspects the provision of the options depicted in the subsequent screen 250 to the user may only be made available during activation of a wireless service and verification of a unique identifier of a near field communication tag or the activation code.

Figure 3:
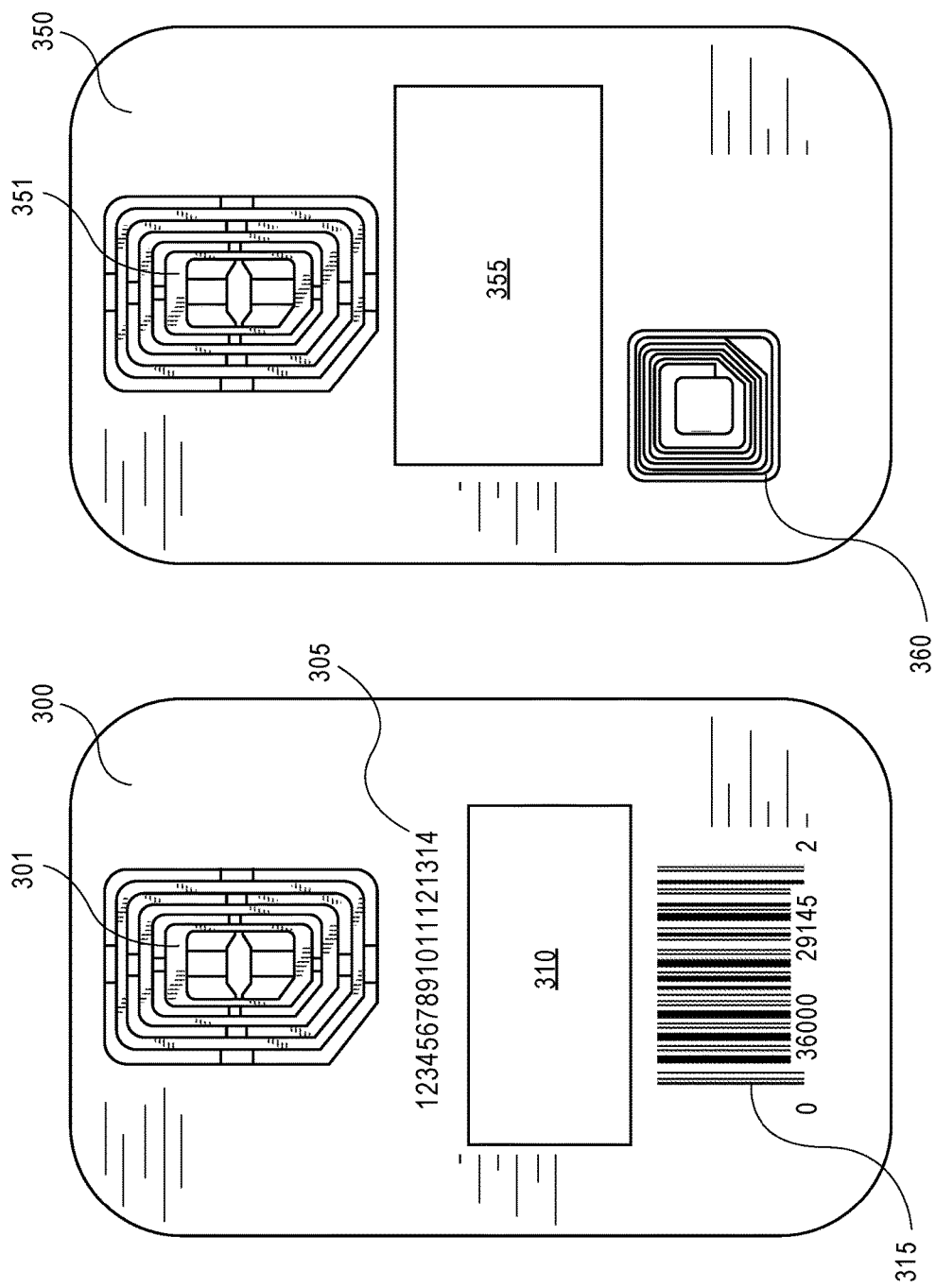
FIG. 3A illustrates a SIM card used for activation of a wireless service.
FIG. 3B illustrates a SIM card with a near field communication tag that can be used according to aspects of the disclosure.

Referring now to FIG. 3A, the SIM card 300 used for authentication of wireless device 100 on a wireless service is depicted. As customers often own their wireless device 100, they may need the SIM card 300 in order to authenticate the wireless device 100 on a particular wireless service provider (mobile network operator (MNO) such as Verizon, AT&T, Sprint, T-Mobile, etc. or a MVNO). The SIM card 300 may be sold individually or in a multipack and may be available at various locations.

The SIM card 300 may be a generally rectangular flat form factor card having a first surface and opposing second surface. The SIM card 300 may include at least one removable subscriber identity module (SIM) 301 arranged in the generally rectangular flat form factor card defined by the first surface. The SIM 301 may be releasably attached to the first surface of the generally rectangular flat form factor of the SIM card 300 by respective breaking tabs.

In an aspect of the disclosure, the SIM card 300 may include the activation code 305 in the form of a series of number as shown or a series of numbers, letters, symbols or a combination thereof. The activation code 305 may be included on a SIM card 300 or the activation code 305 may be included in a memory of the SIM 301 initially held by the SIM card 300. The activation code 305 may be included on the SIM card 300. In order to entice new customers to activate a wireless device 100, the SIM card 300 may be part of a contest, a give-away, a discounted purchase, or a purchase. The activation code 305 may be located under a scratch-off panel and can be manually entered into the wireless device 100 using the user interface 120, automatically retrieved from the memory of the SIM 301, automatically retrieved as it was part of the application 114 or captured as an image with the camera 138. The activation code 305 can be pre-paid amount of wireless service or includes a predetermined amount of wireless credit (as part of winning a contest) for one of more wireless services. The activation code 305 can be unique to one SIM card or can be shared by SIMS in multiple packs. By sharing, this allows additional SIM card activations and thus, new customers for the MVNOs.

In another aspect, a bar code 315 may be used as an alternative or in addition to the activation code 305. The bar code 315 can include the same series of numbers, letters, symbols or a combination thereof that are similar to the activation code 305. The bar code 315 can be scanned using the camera 138, alternatively a bar code reader (not shown) that can be attached to the wireless device 100, or the like. Both the activation code 305 and the bar code 315 have previously been recorded and correlated to a predetermined amount of credit for a particular wireless service/wireless services, in a backend system's database. Further, both the activation code 305 and the bar code 315 can include credit for all services such as talk, text and data or can be limited to one or any combination thereof as desired.

Further, the SIM card 300 may include an advertisement portion 310 that shows the wireless service provider and the specific amount of data and/or time being provided. In addition or alternatively, other types of advertisement, such as third party logos may be included in the advertisement portion 310.

Referring now to FIG. 3B, a SIM card 350 having a near field communication tag 360 according to aspects of the present disclosure is illustrated. In some aspects, more than one near field communication tag 360 can be included in the SIM card 350. The SIM card 350 may include a SIM 351. The near field communication tag 360 may have either read only data capability or may have rewriteable data capability. As such, configurability, memory, security, data retention and write endurance, may all vary according to the activation application. The variations of the near field communication tags included and the number of tags which can be utilized to streamline the wireless service activation process, provide a more secure sale and activation process, provide for less data storage in backend databases, post distribution programmability of the airtime cards, and eliminate point-of-sale requirements.

The SIM card 350 may be a generally rectangular flat form factor card having a first surface and opposing second surface. The SIM card 350 may include at least one removable subscriber identity module (SIM) 351 arranged in the generally rectangular flat form factor card defined by the first surface. The SIM 351 may be releasably attached to the first surface of the generally rectangular flat form factor of the SIM card 350 by respective breaking tabs.

According to some aspects of the disclosure, a near field communication equipped wireless device 100, e.g. smart phone, can be paired with the near field communication tag 360 to automate a task including, for example, a change in phone settings, a text to be created and sent, an application to be launched, or any number of commands to be executed, for the purchase/sale, payment, activation of a wireless service, and/or monitoring of wireless services sold/authorized. These automated tasks may also be performed based on the activation code 305 or bar code 315.

The SIM card 350 may also include a generic label 355 that can advertise similar or different information as advertisement portion 310. This may be achieved when using a reprogrammable near field communication tag 360 which can be programmed at a store or a kiosk, for example. Further, by simply bringing the near field communication enabled wireless device to a distance of 10 cm or less, the activation and/or purchase of wireless services can be automated and streamlined. For example, quicker verification of codes can result since the system is more secure and the need of storing all unique codes and correlated services on a backend system's database prior to distribution is eliminated.

Figure 4:
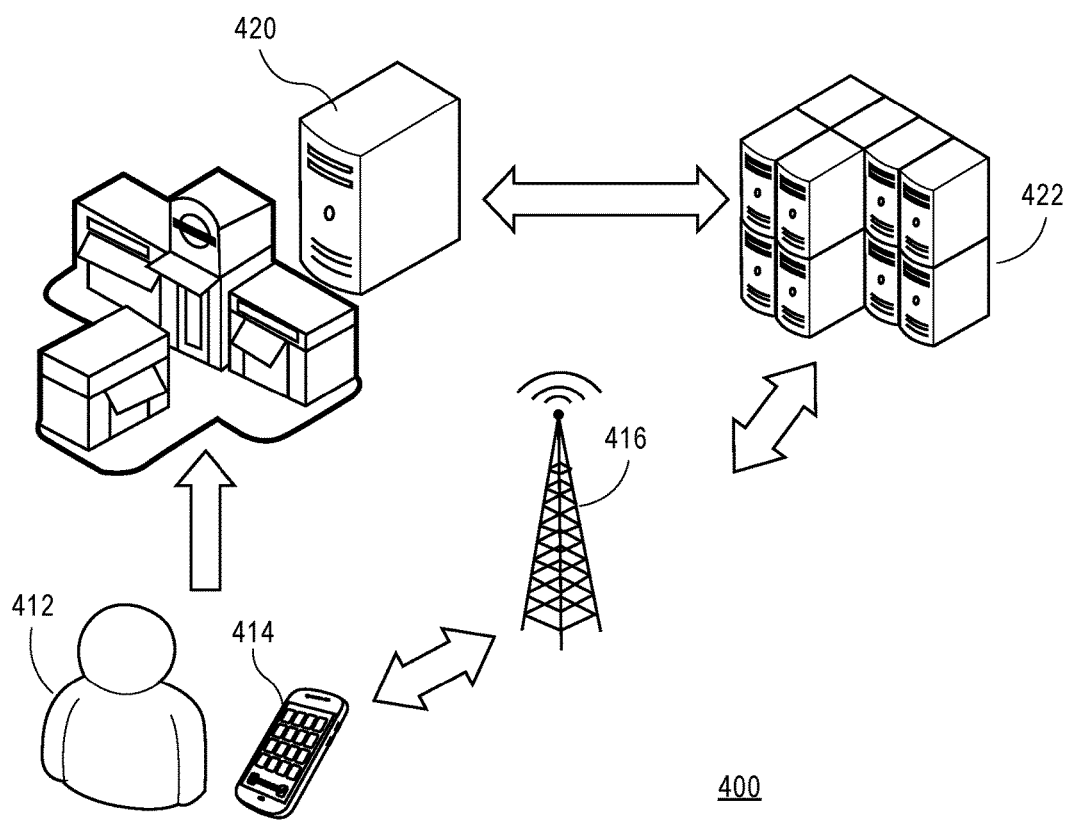
FIG. 4 illustrates a schematic diagram of an exemplary wireless service activation system in accordance with aspects of the disclosure.

Referring now to FIG. 4, a schematic diagram of an exemplary wireless service activation system according to aspects of the disclosure is depicted. In particular, the wireless service activation system 400 can be used to activate wireless network service(s) on a wireless device 100 implementing various aspects of the SIM card activation using the disclosed code and/or near field communication systems. Unlike conventional activation processes for wireless devices that can require a user 412 to contact a live customer service representative, utilize an interactive voice response system from a landline or another wireless device, manually input the code, or access an Internet website by the user 412 to use a website activation system, the present wireless service activation system 400 can be used to activate a wireless device 414, such as the wireless device 100, and/or activate services with automated code/information gathering and without requiring access to an agent, a website, or the like.

According to aspects of the disclosure, the activated service(s) may include, for example, activation of a wireless service after or during the initial activation of the wireless device 100 by a user 412. The initial activation of the wireless device 414, such as the wireless device 100, may be described herein as "out of the box" activation and may take place at the point-of-sale 420, which may have a contest give away. Alternatively, the contest give away may be independent of the point-of-sale 420, such as via mail, or at special events (concerts, contest sites, parties, and the like). In some additional aspects, the services requested to be activated and authorized are one or combinations of: airtime, text messaging, and data plans, but may also include at least one of device upgrades, device reactivations, wireless number changes, and wireless number porting for wireless devices that have previously been activated.

According to some aspects of the disclosure, the point-of-sale 420 can include, for example, a store retailer, a vending machine, a kiosk, and the like. The contest give away can provide winning contestants with the SIM card 300 or SIM card 350 depending on the desired activation. In an aspect of the disclosure, the SIM card 300 and SIM card 350 may both include the activation code 305 and the near field communication tag 360. When the contestant or user is ready to activate the SIM card 300, he can simply enter the activation code 305 into the wireless device 100 using the user interface 120. Alternatively, the activation code 305 stored in the memory of the SIM 301 may be retrieved by the wireless device 100. Alternatively, the user can take a picture of the activation code 305 or scan the bar code 315 using the camera 138. Then the user inserts the SIM card 300 into the wireless device 100. Then through the user interface 120 or touchscreen 122, the user 412 can activate the wireless device 100 using the wireless service activation application 114. The SIM card 300 can be configured to solely communicate with a wireless network provider using limited data communication even though the SIM card 300 has not been permanently authenticated. In one aspect, the wireless service activation application 114 communicates with the wireless provider backend system 422 through a cell tower 416. Then the wireless provider backend system 422 authenticates (permanently) the SIM card 300 and authorizes the predetermined number of talk time, text, or data or a combination thereof based on the activation code 305 or the code stored on bar code 315.

Alternatively, the wireless provider backend system 422 may also include an interface with other authentication or payment services such as Google Wallet™, Google Play™, Android Market™, Apple Store™, or the like. Additionally, the wireless service activation application 114 can simply request the user to enter his ZIP Code or use the built in global navigation system (GNSS) in the wireless device 100 in order to authorize and activate the SIM card 300, 350 based on location or billing area.

It should be noted, that regardless of the method of authentication and authorization by activation code 305, the bar code 315 and/or the near field communication tag 360, the contestant can't simply use the activation code to add additional services (talk time, text, and/or data) to a different SIM card other than to the SIM card that the activation code is linked to. Additionally, the amount or type of services preauthorized by the activation code may be valid on a single SIM card or multiple SIM cards. In another aspect, the wireless service activation application 114 can simply access the database 116 stored on the wireless device 100 in order to authenticate and authorize the SIM 301, 351 of the SIM card 300 or SIM card 350. The database 116 can be previously stored on the wireless device 100 and can be supplemented via access to the wireless provider backend system 422 or simply downloaded at the time of activation.

The point-of-sale 420 may also include a near field communication system 425 that can be used for payment and/or executing security and activation protocols using one or more near field communication tag(s) 360. Further, the near field communication system 425 at the point-of-sale 420 can be configured to communicate with the near field communication tag 360 and in some aspects the wireless device 100, which may also be configured to be in communication with the wireless provider backend system 422. In one aspect, the wireless provider backend system 422 may be implemented as a server. Communication with the wireless device 100 may include, for example, one or more of: communication using the wireless device's near field communication interface 134, a wire connector, a data messaging channel, such as an Unstructured Supplementary Service Data (USSD) channel, a Short Message Service (SMS) messaging channel or a Wireless Application Protocol (WAP) messaging channel, a personal area network (PAN), such as a Bluetooth™ communication, an induction wireless communication, an infrared wireless communication, an ultra-wideband communication, a ZigBee™ communication, a wireless fidelity communication channel, a local area network (LAN), and/or a communication channel as defined herein.

Communication between the near field communication system 425 of the point-of-sale 420 and the wireless device 100 may be used to transmit a payment or redeem a credit for a wireless service and/or automatically retrieve and/or generate wireless device-related information based on a user's input selection. According to some aspects of the present disclosure, the wireless service selection can be made by scanning a near field communication tag 360 of the SIM card 350 using the near field communication interface 134 of the wireless device 100, and can include a wireless provider selection, and/or a wireless service type and amount to be activated. In some aspects, the near field communication tag 360 can further be scanned by the near field communication system 425 at the point-of-sale 420, for example, for verification, authorization, and/or security encryption.

The wireless service selection, near field communication tag 360 unique identifier, and wireless device 100 related information may be transferred to a wireless provider backend system 422. The wireless device-related information can include, for example, the International Mobile Station Equipment Identify ("IMEI"), an Electronic Serial Number (ESN), Mobile Equipment Identifier (MEID), and/or a serial number for a subscriber identity module (SIM) card installed in the wireless device 100. The SIM card 300, 350 may include a SIM card memory for storing at least a SIM card serial number, for example, an Integrated Circuit Card ID (ICCID). A wireless device 100 not utilizing a SIM card is contemplated as well for use with the disclosure.

In some aspects, the information transferred may be in the form of an activation message that corresponds and/or includes the wireless provider and/or wireless service selection by the user 412 and automatically retrieved wireless device related information, the near field communication tag 360 unique identifier, and/or payment/authorization verification from the point-of-sale 420. The activation message including the automatically retrieved information can be generated by a processor including, for example, the processor of the wireless device 100 and/or a processor at the point-of-sale 420. In some aspects, the activation message may be transmitted over a provisioning channel provided over a cell tower 416 that is available to inactive or unprovisioned wireless devices or via any type of conventional activation protocols known in the art. Alternatively, the activation message can be transmitted from the point-of-sale 420 via any wired or other wireless communication type to the wireless provider backend system 422. The wireless provider backend system 422 can include one or more databases wherein authorized unique identifiers of a near field communication tag 360 may be correlated/recorded when a wireless service is redeemed and/or purchased.

Figure 5:
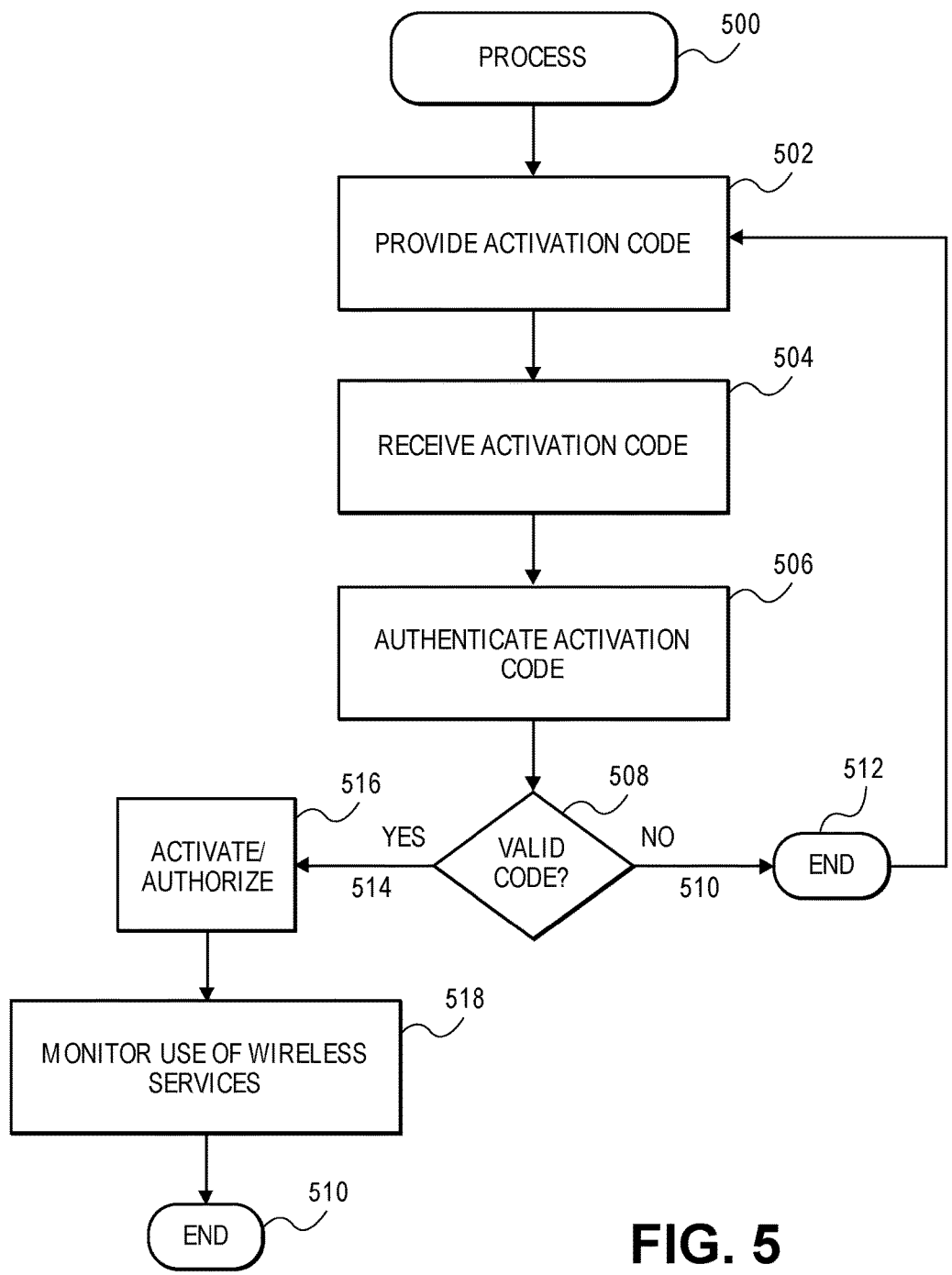
FIG. 5 illustrates exemplary method steps which may be used to implement the system of the disclosure.

Referring now to FIG. 5, exemplary method steps, which may be used to implement systems of the disclosure, are depicted in a flowchart 500. In particular, the method steps include ways in which a user can provide an activation code located on the SIM card 300, 350 to activate one or more wireless service(s) on the wireless device 100. At step 502, the user provides an activation code 305 in the form of a code (letters, numbers, symbols or combination thereof) that was captured by the camera 138, manually entered using the user interface 120, a bar code 315 captured by the camera 138, a near field communication tag 360 using the near field communication interface 134, or stored electronically in the SIM 301. The activation code may include a programmed identifier that can correspond to a wireless provider selection and one or more wireless service to be activated. For example, the identifier may include a first code corresponding to a wireless provider, followed by a second code corresponding to a wireless service type, and followed by a third code corresponding to an amount that is being redeemed. It is contemplated that additional codes may be included for additional services and amounts, security codes, as well as for production data for statistical analysis performed by the wireless provider, as it may be desired. Each of the codes may be a series of digits including letters, symbols, and/or numbers.

At step 504, activation code 305 can be received by the wireless device 100, or the near field communication interface 134 and/or the near field communication system 425 at the point-of-sale 420. If received by the wireless device 100 and/or the near field communication interface 134, then the wireless device can transmit the activation code to the cell tower 416, which then relays the code to the wireless provider backend system 422 for authentication. If the activation code is received by near field communication system 425 at the point-of-sale 420, then the activation code is sent to the wireless provider backend system 422 for authentication.

At step 508, the activation code 305, the bar code 315, or the near field communication tag 360 codes along with wireless device 100 information are received by the wireless provider backend system 422 where it can verify the authentication code by searching one or more databases. Alternatively, the database can be preloaded with information relating to the wireless device 100 and the activation code 305 is authenticated by the wireless device 100 through the wireless service activation application. In one aspect, prior to sending the activation code 305, the bar code 315 or the near field communication tag 360 to the wireless provider backend system 422, a text message containing temporary log in information may be sent to the wireless device for use by the wireless service activation application to log into the wireless provider backend system 422. At step 510, if the activation code is not valid, the activation of the wireless service will be stopped at step 512. Upon stopping the activation 512 of the wireless service, the wireless provider backend system 422 may send a warning message to the user 412 (e.g., using the wireless device 100) and/or the wireless provider and proceed back to step 502 and wait for the valid authentication code to be provided. At step 514, if the activation code is valid (authentic, not been previously used, or the like), authorization of a wireless service may take place at step 516. At step 518, the use of the activated wireless service may be monitored to determine when the activated wireless service has been depleted by the user 412. At step 520 the process ends.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an inter-network, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

Aspects of the disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Aspects of the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

The SIM 301 and SIM 351 may be an integrated circuit chip that is intended to securely store the international mobile subscriber identity (IMSI) number and its related key, which are used to identify and authenticate subscribers on mobile telephony devices (such as mobile phones and computers). The SIM 301 and SIM 351 may include a SIM circuit that may be part of the function of a Universal Integrated Circuit Card (UICC) physical smart card, which may be made of PVC with embedded contacts and semiconductors. The SIM 301 and SIM 351 may contain a unique serial number (ICCID), international mobile subscriber identity (IMSI) number, security authentication and ciphering information, temporary information related to the local network, a list of the services the user has access to, and the like. The SIM 301 and SIM 351 may store network-specific information used to authenticate and identify subscribers on the network. For example, the ICCID, IMSI, Authentication Key (Ki), Local Area Identity (LAI) and Operator-Specific Emergency Number. The SIM 301 and SIM 351 may store other carrier-specific data such as the SMSC (Short Message Service Center) number, Service Provider Name (SPN), Service Dialing Numbers (SDN), Advice-Of-Charge parameters and Value Added Service (VAS) applications.

The many features and advantages of the disclosure are apparent from the detailed specification, and, thus, it is intended by the appended claims to cover all such features and advantages of the disclosure, which fall within the true spirit, and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

The invention claimed is:

1. A system for activating a wireless service, the system comprising:
a subscriber identity module (SIM) card having a first surface;
the SIM card comprising a subscriber identity module (SIM); and
an activation code stored with the SIM card, the activation code is linked to said SIM, the activation code authorizes on a wireless network a predetermined amount of wireless service,
the SIM is configured to be utilized in a wireless device, the wireless device comprising:
a memory that stores an operating system of the wireless device and a wireless service activation application;
a processor that processes a function of the wireless device;
a display that displays information to a user, wherein the display includes a touch screen;
the processor implements the wireless service activation application, the wireless service activation application is configured to capture the activation code from the SIM card that authorizes the wireless device on the wireless network and authorizes the predetermined amount of wireless service for the wireless device associated with said SIM; and
a transceiver configured to transmit the activation code to a wireless network backend system to validate the activation code and provision the predetermined amount of wireless service;
the system further comprising:
the wireless network backend system configured to validate the activation code and provision the predetermined amount of wireless service; and
an accounting unit configured to monitor the usage of the wireless service of the wireless device.

2. The system of claim 1,
wherein the wireless device further comprises a near field communication reader in communication with the processor, and
wherein the SIM card also includes a near field communication tag storing the activation code.

3. The system of claim 1,
wherein the SIM card includes the activation code on the first surface; and
wherein the wireless device further comprises a camera in communication with the processor, the camera configured to capture the activation code on said SIM card that authorizes the wireless device on the wireless network and authorizes the predetermined amount of wireless service.

4. The system of claim 1,
wherein the SIM electronically stores the activation code; and
wherein the wireless device further implements the wireless service activation application to retrieve the activation code stored in said SIM that authorizes the wireless device on the wireless network and authorizes the predetermined amount of wireless service.

5. The system of claim 1,
wherein the SIM card includes the activation code on the first surface; and
wherein the wireless device is further configured to implement the wireless service activation application to manually receive the activation code from the user that authorizes the wireless device on the wireless network and authorizes the predetermined amount of wireless service.

6. The system of claim 5, wherein the activation code is a bar code.

7. The system of claim 5, wherein the activation code is an alpha numeric code.

8. The system of claim 1, wherein the accounting unit is further configured to determine if wireless service has been depleted and thereafter configured to control a usage of the wireless service.

9. The system of claim 1, wherein the wireless network backend system includes a database that includes activation data that validates the activation code and allows the wireless service activation application to authorize the predetermined amount of wireless service of the wireless device using said SIM.

10. A device for activating a wireless service, the device comprising:
a subscriber identity module (SIM) card having a first surface;
the SIM card comprising a subscriber identity module (SIM); and
an activation code stored with the SIM card, the activation code is linked to said SIM, the activation code authorizes on a wireless network a predetermined amount of wireless service,
wherein the SIM is configured to be utilized in a wireless device configured to receive the SIM, the wireless device comprising:
a processor that processes a function of the wireless device;
a display that displays information to a user, wherein the display includes a touch screen;
the processor is configured to capture the activation code from the SIM card that authorizes the wireless device on the wireless network and authorizes the predetermined amount of wireless service for the wireless device associated with said SIM; and
a transceiver configured to transmit the activation code to a wireless network backend system to validate the activation code and provision the predetermined amount of wireless service, the usage of the wireless service of the wireless device being monitored by an accounting unit.

11. The device of claim 10,
wherein the wireless device further comprises a near field communication reader in communication with the processor, and
wherein the SIM card also includes a near field communication tag storing the activation code.

12. The device of claim 10,
wherein the SIM card includes the activation code on the first surface; and
wherein the wireless device further comprises a camera in communication with the processor, the camera configured to capture the activation code on said SIM card that authorizes the wireless device on the wireless network and authorizes the predetermined amount of wireless service.

13. The device of claim 10,
wherein the SIM electronically stores the activation code; and
wherein the wireless device further implements a wireless service activation application to retrieve the activation code stored in said SIM that authorizes the wireless device on the wireless network and authorizes the predetermined amount of wireless service.

14. The device of claim 10,
wherein the SIM card includes the activation code on the first surface; and
wherein the wireless device is further configured to implement a wireless service activation application to manually receive the activation code from the user that authorizes the wireless device on the wireless network and authorizes the predetermined amount of wireless service.

15. The device of claim 10, wherein the accounting unit is further configured to determine if wireless service has been depleted and thereafter configured to control a usage of the wireless service.

16. A process for authorizing wireless service, the process comprising:
providing a generally rectangular flat form factor card having a first surface and opposing second surface;
providing a removable subscriber identity module (SIM) arranged in the generally rectangular flat form factor card defined by the first surface, wherein the removable subscriber identity module (SIM) is releasably attached to the first surface of the generally rectangular flat form factor card;
providing an activation code stored at least in one of the following: the removable subscriber identity module (SIM) and the generally rectangular flat form factor card, wherein the activation code is configured to authorize wireless service associated with the removable subscriber identity module (SIM) when provided to a system associated with a wireless service provider;
receiving the activation code in a wireless network backend system to validate the activation code and provision a predetermined amount of wireless service;
provisioning the wireless service to a wireless device from a wireless network when the wireless device operates in conjunction with the removable subscriber identity module (SIM) after the wireless network backend system validates the activation code and the activation code is provided to the system associated with the wireless network; and
monitoring the usage of the wireless service of the wireless device by an accounting unit.

17. The process of claim 16, further comprising providing the wireless device with a near field communication reader in communication with a processor of the wireless device, and
wherein the removable subscriber identity module (SIM) also includes a near field communication tag storing the activation code.

18. The process of claim 16,
wherein the generally rectangular flat form factor card includes the activation code; and
wherein the wireless device further comprises a camera in communication with a processor of the wireless device, the camera configured to capture the activation code on the generally rectangular flat form factor card that authorizes the wireless device on the wireless network and authorizes the predetermined amount of wireless service.

19. The process of claim 16, wherein the SIM electronically stores the activation code; and wherein the wireless device further implements a wireless service activation application to retrieve the activation code stored in said SIM that authorizes the wireless device on the wireless network and authorizes the predetermined amount of wireless service.

20. The process of claim 16,
wherein the removable subscriber identity module (SIM) includes the activation code on the first surface; and
wherein the wireless device is further configured to implement a wireless service activation application with a processor of the wireless device, the processor configured to manually receive the activation code from a user that authorizes the wireless device on the wireless network and authorizes the predetermined amount of wireless service.

* * * * *